US012631992B2

(12) United States Patent
Kubo

(10) Patent No.: US 12,631,992 B2
(45) Date of Patent: May 19, 2026

(54) TRANSFER BELT AND IMAGE FORMING APPARATUS INCORPORATING TRANSFER BELT

(71) Applicant: Hidetaka Kubo, Kanagawa (JP)

(72) Inventor: Hidetaka Kubo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/776,270

(22) Filed: Jul. 18, 2024

(65) Prior Publication Data

US 2025/0036046 A1 Jan. 30, 2025

(30) Foreign Application Priority Data

Jul. 26, 2023 (JP) ................................. 2023-121746

(51) Int. Cl.
| | |
|---|---|
| *G03G 15/16* | (2006.01) |
| *C08K 3/22* | (2006.01) |
| *C08K 5/19* | (2006.01) |
| *C08K 5/3432* | (2006.01) |
| *C08K 5/43* | (2006.01) |
| *C08K 7/16* | (2006.01) |
| *C08K 13/04* | (2006.01) |

(52) U.S. Cl.
CPC ............. *G03G 15/162* (2013.01); *C08K 3/22* (2013.01); *C08K 5/19* (2013.01); *C08K 5/3432* (2013.01); *C08K 5/43* (2013.01); *C08K 7/16* (2013.01); *C08K 13/04* (2013.01); *C08K 2003/2227* (2013.01); *C08K 2201/001* (2013.01)

(58) Field of Classification Search
CPC ............. G03G 15/1605; G03G 15/162; G03G 2215/16; G03G 2215/1623
See application file for complete search history.

(56) References Cited

U.S. PATENT DOCUMENTS

| | | |
|---|---|---|
| 2011/0042856 A1 | 2/2011 | Aoto et al. |
| 2011/0177238 A1 | 7/2011 | Aoto et al. |
| 2011/0293824 A1 | 12/2011 | Aoto et al. |
| 2012/0082488 A1 | 4/2012 | Kubo et al. |
| 2012/0201578 A1 | 8/2012 | Mashiko et al. |
| 2012/0262739 A1 | 10/2012 | Kubo et al. |
| 2012/0301191 A1 | 11/2012 | Ito |
| 2013/0004212 A1 | 1/2013 | Kubo et al. |

(Continued)

FOREIGN PATENT DOCUMENTS

| | | |
|---|---|---|
| JP | H09-230717 A | 9/1997 |
| JP | 2002-162767 A | 6/2002 |

(Continued)

OTHER PUBLICATIONS

JP 2012247610 English machine translation, Ito, Dec. 13, 2012 (Year: 2012).*

(Continued)

*Primary Examiner* — Thomas S Giampaolo, II
(74) *Attorney, Agent, or Firm* — XSENSUS LLP

(57) ABSTRACT

A transfer belt includes a base layer and an elastic layer disposed on the base layer. The elastic layer has an outer face that has surface asperities defined by spherical particles. The elastic layer includes acrylic rubber and an ion conductant. The ion conductant includes an anionic component made of bis(trifluoromethanesulfonyl)imide (TFSI).

20 Claims, 4 Drawing Sheets

(56) References Cited

U.S. PATENT DOCUMENTS

| | | | |
|---|---|---|---|
| 2013/0129395 A1 | 5/2013 | Kubo et al. | |
| 2014/0079445 A1 | 3/2014 | Katoh et al. | |
| 2014/0248069 A1 | 9/2014 | Kubo et al. | |
| 2014/0248070 A1 | 9/2014 | Kubo et al. | |
| 2015/0241817 A1 | 8/2015 | Kubo et al. | |
| 2015/0261139 A1 | 9/2015 | Kubo et al. | |
| 2017/0227881 A1 | 8/2017 | Ishida et al. | |
| 2017/0269513 A1 | 9/2017 | Kubo et al. | |
| 2018/0046116 A1* | 2/2018 | Takeyama | G03G 15/1685 |
| 2018/0267435 A1 | 9/2018 | Kubo | |
| 2019/0227463 A1 | 7/2019 | Kubo et al. | |
| 2020/0285173 A1 | 9/2020 | Ohmori et al. | |
| 2021/0063916 A1 | 3/2021 | Takei et al. | |
| 2021/0371661 A1* | 12/2021 | Takenaga | C08K 3/26 |
| 2022/0221806 A1 | 7/2022 | Kubo | |

FOREIGN PATENT DOCUMENTS

| | | | |
|---|---|---|---|
| JP | 2004-354716 A | 12/2004 | |
| JP | 2007-328165 A | 12/2007 | |
| JP | 2009-075154 A | 4/2009 | |
| JP | 2012-247610 A | 12/2012 | |
| JP | 2019-101127 A | 6/2019 | |

OTHER PUBLICATIONS

Extended European Search Report issued Dec. 16, 2024 in European Patent Application No. 24185501.4, 9 pages.

* cited by examiner

TRANSFER BELT AND IMAGE FORMING APPARATUS INCORPORATING TRANSFER BELT

CROSS-REFERENCE TO RELATED APPLICATION

This patent application is based on and claims priority pursuant to 35 U.S.C. § 119(a) to Japanese Patent Application No. 2023-121746, filed on Jul. 26, 2023, in the Japan Patent Office, the entire disclosure of which is hereby incorporated by reference herein.

BACKGROUND

Technical Field

Embodiments of this disclosure relate to a transfer belt and an image forming apparatus, and more particularly, to a transfer belt and an image forming apparatus incorporating the transfer belt.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data by electrophotography.

Such image forming apparatuses use a seamless belt for various objectives. For example, an image forming apparatus that forms a full color toner image by electrophotography employs an intermediate transfer belt method in which toner images developed with toners in four colors, that is, yellow, magenta, cyan, and black, respectively, are temporarily superimposed on an intermediate transfer belt serving as an intermediate transferor. Thereafter, the toner images are collectively transferred onto a transfer medium such as paper.

The intermediate transfer belt method uses four developing devices containing the toners in the four colors, respectively, with respect to a single photoconductor. However, the intermediate transfer belt method may decrease a print speed. To address the circumstance, in order to increase the print speed, the image forming apparatus employs a quadruplicate tandem system incorporating four photoconductors that are arranged. The toner images in the four colors, that are formed on the photoconductors, respectively, are transferred onto paper successively. However, the quadruplicate tandem system may be adversely affected by change in a property of the paper, that is caused by an environmental change. Accordingly, the toner images in the four colors, respectively, may not be superimposed on an identical position on the paper precisely, causing shifting of the toner images. To address the circumstance, the image forming apparatus may employ an intermediate transfer method in addition to the quadruplicate tandem system.

Under the circumstance, the intermediate transfer belt is requested to improve properties such as high-speed transfer and precision in superimposing the toner images. Thus, the intermediate transfer belt is requested to satisfy the requested properties. In order to improve precision in superimposing the toner images, the intermediate transfer belt is requested to suppress change due to deformation such as stretch caused by continuous usage. The intermediate transfer belt occupies a substantial span inside the image forming apparatus. The intermediate transfer belt is applied with a high voltage at which the toner images are transferred onto the paper. Hence, the intermediate transfer belt is requested to be flame-resistant. To address the requests described above, the intermediate transfer belt is mainly made of resin having an increased modulus of elasticity and an increased heat resistance such as polyimide and polyamide imide.

However, the intermediate transfer belt made of polyimide has an increased mechanical strength and therefore has an increased surface rigidity. When the toner images are transferred onto the paper, the toner images that are layered are applied with high pressure. The toners of the toner images may be aggregated locally and the toner images may not be partially transferred, generating a spotted toner image formed on the paper. Additionally, the intermediate transfer belt may suffer from degradation in contact with or fit for contact members (e.g., the photoconductor and the paper) at transfer portions (e.g., transfer nips), respectively. Accordingly, the intermediate transfer belt may suffer from faulty contact (e.g., a gap) locally at the transfer portions, resulting in uneven transfer of the toner images.

The image forming apparatus forms a full color toner image on various types of sheets by electrophotography frequently. The various types of sheets include regular paper that has a smooth surface, coated paper that has a slippery surface having an increased smoothness, and recycled paper, embossed paper, Japanese paper, and kraft paper that have a rough surface. The intermediate transfer belt is requested to fit the sheets of various types, that have different surface properties as described above. If the intermediate transfer belt does not fit the sheets of various types, the toner image formed on the sheet having the rough surface may suffer from uneven shading and uneven tone of color. To address the circumstance, the image forming apparatus may include an intermediate transfer belt constructed of a base layer and an elastic layer that is disposed on the base layer and made of rubber. The elastic layer is flexible relatively.

The intermediate transfer belt may further include a protective layer. However, in a case that the protective layer made of a material that achieves sufficient transfer performance coats the elastic layer, the protective layer may not fit the elastic layer that is flexible. Accordingly, the protective layer may be broken or peeled off. To address the circumstance, the intermediate transfer belt has a surface that is adhered with fine particles to improve a transfer property for transferring the toner image.

SUMMARY

This specification describes below an improved transfer belt. In one embodiment, the transfer belt includes a base layer and an elastic layer disposed on the base layer. The elastic layer has an outer face that has surface asperities defined by spherical particles. The elastic layer includes acrylic rubber and an ion conductant. The ion conductant includes an anionic component made of bis(trifluoromethanesulfonyl)imide (TFSI).

This specification further describes an improved image forming apparatus. In one embodiment, the image forming apparatus includes an image bearer that bears a latent image, a developing device that develops the latent image into a toner image, and the transfer belt described above that is disposed opposite the image bearer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
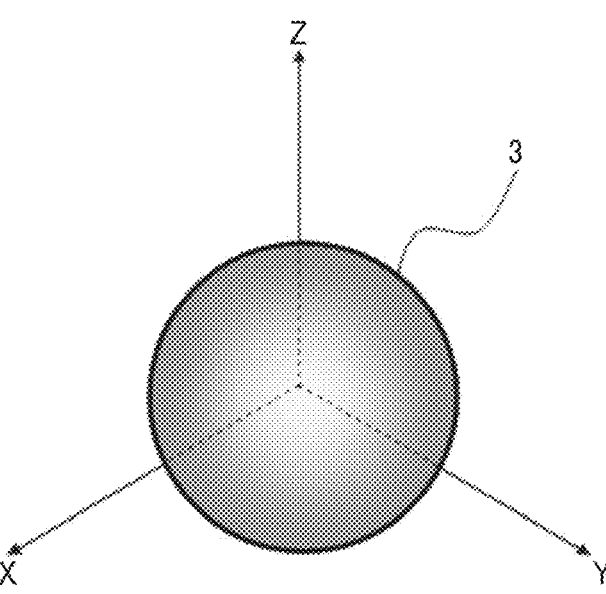
FIG. 1 is a schematic perspective view of a particle according to an embodiment of the present disclosure, illustrating a shape thereof.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An image forming apparatus includes seamless belts employed by a plurality of elements. As one of the seamless belts employed by major elements having an electrical property, an intermediate transfer belt serving as an intermediate transferor is used.

Referring to FIGS. 1, 2, 3, 4A, and 4B, a description is provided of a configuration of the intermediate transfer belt according to an embodiment of the present disclosure.

The intermediate transfer belt according to the embodiment of the present disclosure is preferably installed in the image forming apparatus employing an intermediate transfer belt method. The image forming apparatus includes at least one image bearer (e.g., a photoconductive drum) on which a plurality of toner images in different colors, respectively, is formed successively. The toner images are primarily transferred onto the intermediate transfer belt successively such that the toner images are superimposed on the intermediate transfer belt. The toner images are secondarily transferred onto a recording medium collectively.

Figure 2:
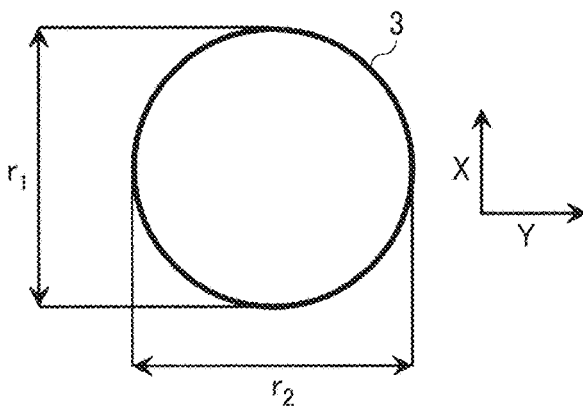
FIG. 2 is a schematic cross-sectional view of the particle depicted in FIG. 1, illustrating a cross section thereof.
Figure 3:
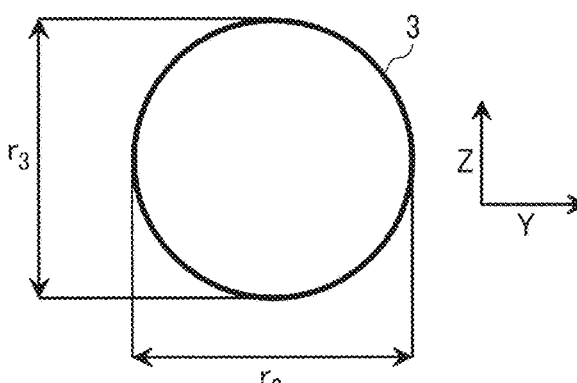
FIG. 3 is a schematic cross-sectional view of the particle depicted in FIG. 1, illustrating another cross section thereof.
Figure 4A:
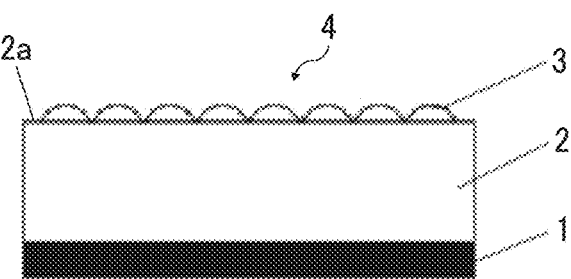
FIG. 4A is an enlarged, schematic cross-sectional view of an intermediate transfer belt according to an embodiment of the present disclosure, that incorporates the particle depicted in FIG. 1.
Figure 4B:
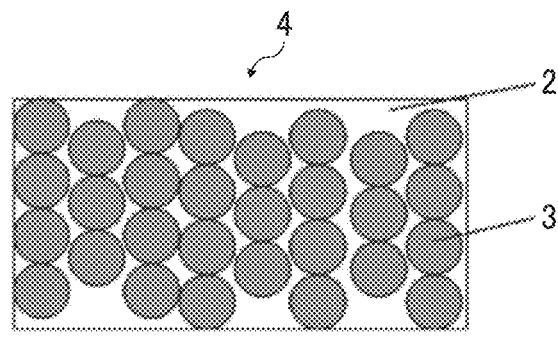
FIG. 4B is an enlarged, schematic plan view of a surface of the intermediate transfer belt depicted in FIG. 4A.

FIGS. 1 to 3 illustrate a spherical particle 3. FIGS. 4A and 4B illustrate a layer construction of an intermediate transfer belt 4 according to an embodiment of the present disclosure. The intermediate transfer belt 4 includes a base layer 1, an elastic layer 2, and spherical particles 3. The base layer 1 is rigid and bendable relatively. The elastic layer 2 is flexible and mounted on the base layer 1. The spherical particles 3 define an outer face 2a as an outermost surface layer of the intermediate transfer belt 4. The spherical particles 3 are mounted and arranged on the elastic layer 2 in a surface direction thereof such that the spherical particles 3 are embedded separately in the elastic layer 2. Thus, the spherical particles 3 define irregularities uniformly on the elastic layer 2. In a case that the spherical particles 3 according to the embodiment of the present disclosure are not aggregated and are separate particles, respectively, the spherical particles 3 are barely superimposed in a thickness direction of the intermediate transfer belt 4 and are barely embedded in the elastic layer 2 entirely.

A description is provided of a configuration of the base layer 1.

The base layer 1 is made of a material containing resin that contains a filler or an additive, that is, an electric resistance adjuster that adjusts electric resistance. For example, in view of flame retardancy, the resin preferably includes fluororesin such as polyvinylidene fluoride (PVDF) and ethylenetetrafluoroethylene (ETFE), polyimide, or polyamide imide. In view of mechanical strength (e.g., enhanced elasticity) and heat resistance, the resin preferably includes polyimide or polyamide imide.

The electric resistance adjuster includes metal oxide, carbon black, an ion conductant, and a conductive polymer material. For example, the metal oxide includes zinc oxide, tin oxide, titanium oxide, zirconium oxide, aluminum oxide, and silicon oxide. In order to improve dispersibility, the metal oxide is treated with surface finishing in advance. For example, the carbon black includes kedjen black, furnace black, acetylene black, thermal black, and gas black. For example, the ion conductant includes tetraalkylammonium salt, benzyltrialkylammonium chloride, alkyl sulfonate, alkylbenzene sulfonate, alkyl sulfate, glycerin fatty acid ester, sorbitan fatty acid ester, polyoxyethylene alkylamine, polyoxyethylene fatty alcohol ester, alkyl betaine, and lithium perchlorate. The above-described compounds may be combined.

The electric resistance adjuster according to the embodiment of the present disclosure is not limited to the compounds described above.

A method for manufacturing the intermediate transfer belt 4 according to the embodiment of the present disclosure uses a coating liquid containing at least a resin component. The coating liquid may further contain an additive such as a dispersion aid, a reinforcement material, a lubricant, a thermal conduction material, and an antioxidant.

In a case that the intermediate transfer belt 4 is a seamless belt that is preferably installed in the image forming apparatus, the seamless belt is preferably made of a material containing carbon black in an amount that attains a surface resistance in a range of from $1 \times 10^8 \Omega / \square$ to $1 \times 10^{13} \Omega / \square$ and a volume resistance in a range of $1 \times 10^8$ $\Omega \cdot cm$ to $1 \times 10^{11}$ $\Omega \cdot cm$ as resistance values. In view of mechanical strength, the material in an amount that does not cause coating of the seamless belt to be fragile and breakable is selected. In a case that the seamless belt is used as the intermediate transfer belt 4, the resin component (e.g., a polyimide resin precursor or a polyamide imide resin precursor) and the electric resistance adjuster are mixed with proper adjustment into a coating liquid. The seamless belt is preferably manufactured with the coating liquid to achieve a balance between an electric property (e.g., the surface resistance and the volume resistance) and the mechanical strength.

The base layer 1 has a thickness that is not limited and is selected properly according to an objective of the base layer 1. The thickness of the base layer 1 is preferably not smaller than 30 μm and not greater than 150 μm, more preferably not smaller than 40 μm and not greater than 120 μm, and even more preferably not smaller than 50 μm and not greater than 80 μm. If the thickness of the base layer 1 is smaller than 30 μm, the intermediate transfer belt 4 is subject to fissure and tear. If the thickness of the base layer 1 is greater than 150 μm, the intermediate transfer belt 4 is subject to bend and breakage. Conversely, if the thickness of the base layer 1 is not smaller than 50 μm and not greater than 80 μm, the base layer 1 enhances durability of the intermediate transfer belt 4 advantageously. In order to improve stability in rotation of the intermediate transfer belt 4, the base layer 1 preferably reduces uneven coating thickness.

A method for adjusting the thickness of the base layer 1 is not limited and is selected properly according to an objective of the base layer 1. For example, the thickness of the base layer 1 is measured with a coating thickness gauge of a contact type or an eddy current type. A cross section of a coating of the base layer 1 is measured with a scanning electron microscope (SEM).

In a case that the electric resistance adjuster contains carbon black, a content of the electric resistance adjuster according to the embodiment of the present disclosure is in a range not smaller than 10 percent by mass and not greater than 25 percent by mass, preferably in a range not smaller than 15 percent by mass and not greater than 20 percent by mass, of total solids in the coating liquid. In a case that the electric resistance adjuster contains metal oxide, a content of the electric resistance adjuster is in a range not smaller than 1 percent by mass and not greater than 50 percent by mass, preferably in a range not smaller than 10 percent by mass and not greater than 30 percent by mass, of total solids in the coating liquid. If the content of the electric resistance adjuster is smaller than each of the ranges described above, the base layer 1 may not attain an even resistance value easily and may suffer from increased change in the resistance value with respect to an arbitrary electric potential. If the content of the electric resistance adjuster is greater than each of the ranges described above, the intermediate transfer belt 4 may suffer from a decreased mechanical strength that degrades usage of the intermediate transfer belt 4.

The base layer 1 according to the embodiment of the present disclosure is made of polyimide or polyamide imide that is available from manufacturers such as Du Pont-Toray Co., Ltd., UBE Corporation, New Japan Chemical Co., Ltd., JSR Corporation, UNITIKA Ltd., I.S.T Corporation, Resonac Holdings Corporation, Toyobo Co., Ltd., and Arakawa Chemical Industries, Ltd., as general products.

A description is provided of a configuration of the elastic layer 2.

The elastic layer 2 is mounted on the base layer 1. The elastic layer 2 is preferably made of acrylic rubber in view of ozone resistance, flexibility, adhesion to the spherical particles 3, flame retardancy, stable resistance to environment, and affinity with bis(trifluoromethanesulfonyl)imide.

A description is provided of acrylic rubber.

The elastic layer 2 according to the embodiment of the present disclosure is made of acrylic rubber (e.g., alkyl acrylate copolymer (ACM)) that is commercially available and is not limited. However, among various cross-linkages of acrylic rubber (e.g., an epoxy group, an active chlorine group, and a carboxyl group), the cross-linkage of the carboxyl group is advantageous in a rubber property (e.g., compression set) and machining. Hence, the cross-linkage of the carboxyl group is preferably selected.

Acrylic rubber of the cross-linkage of the carboxyl group preferably uses an amine compound as a cross-linker. A polyvalent amine compound is especially preferable. For example, the amine compound includes an aliphatic polyvalent amine cross-linker and an aromatic polyvalent amine cross-linker. The aliphatic polyvalent amine cross-linker includes hexamethylene diamine, hexamethylene diamine carbamate, and N,N'-dicinnamylidene-1,6-hexanediamine.

The aromatic polyvalent amine cross-linker includes 4,4'-methylenedianiline, m-phenylenediamine, 4,4'-diaminodiphenyl ether, 3,4'-diaminodiphenyl ether, 4,4'-(m-phenylenediisopropylidene)dianiline, 4,4'-(p-phenylene-diisopropylidene)dianiline, 2,2'-bis [4-(4-aminophenoxy) phenyl]propane, 4,4'-diaminobenzanilide, 4,4'-bis(4-aminophenoxy) biphenyl, m-xylylenediamine, p-xylylenediamine, 1,3,5-benzenetriamine, and 1,3,5-benzenetriaminomethyl.

The cross-linker is mixed with acrylic rubber in an amount of 100 parts by weight, preferably in an amount range of the cross-linker, that is not smaller than 0.05 parts by weight and not greater than 20 parts by weight, and more preferably in an amount range not smaller than 0.1 parts by weight and not greater than 5 parts by weight.

If the amount of the cross-linker mixed with acrylic rubber is excessively small, cross-linkage is insufficient, degrading shape retaining of a crosslinking substance. Conversely, if the amount of the cross-linker mixed with acrylic rubber is excessively great, the crosslinking substance is hardened excessively, degrading elasticity and the like as crosslinked rubber.

The elastic layer 2 according to the embodiment of the present disclosure that is made of acrylic rubber may be further mixed with a cross-linking promoter as a combination with the cross-linker. The cross-linking promoter is also not limited. However, the cross-linking promoter may be preferably combined with the polyvalent amine cross-linker. For example, the cross-linking promoter includes a guanidine compound, an imidazole compound, quaternary onium salt, a polyvalent tertiary amine compound, a tertiary phosphine compound, and weak acid alkali metal salt. The guanidine compound includes 1,3-diphenylguanidine and 1,3-di-o-tolylguanidine. The imidazole compound includes 2-methylimidazole and 2-phenylimidazole. The quaternary onium salt includes tetra-n-butylammonium bromide and octadecyltri-n-butylammonium bromide. The polyvalent tertiary amine compound includes triethylene diamine and 1,8-diazabicyclo [5.4.0]undecene-7(DBU). The tertiary phosphine compound includes triphenylphosphine and tri-p-tolylphosphine.

The weak acid alkali metal salt includes inorganic weak acid salt such as sodium phosphate, potassium phosphate, and carbonate and organic weak acid salt such as stearate and laurate.

An amount of the cross-linking promoter used per 100 parts by weight of acrylic rubber is preferably in an amount range not smaller than 0.1 parts by weight and not greater than 20 parts by weight and more preferably in an amount range not smaller than 0.3 parts by weight and not greater than 10 parts by weight. If the amount of the cross-linking promoter is excessively great, cross-linkage may be performed at an excessively high speed. The cross-linking promoter may generate blooming on a surface of the crosslinking substance. The crosslinking substance may be hardened excessively. If the amount of the cross-linking promoter is excessively small, the crosslinking substance may suffer from substantial decrease in tensile strength. The crosslinking substance may suffer from substantial change in stretch after being applied with thermal load or substantial change in tensile strength.

A description is provided of the ion conductant.

The ion conductant includes various perchlorate and ion liquid. In view of suppressing separation of the spherical particles 3 and preventing surface precipitation (e.g., bleeding and blooming), the ion conductant preferably includes bis(trifluoromethanesulfonyl)imide as an anionic component. The anionic component is combined with a cationic component that is not limited. However, the cationic component includes butylbishydroxyethylmethylammonium, ethylmethylimidazolium, butyl-3-methylpyridinium, and diallyldimethylammonium. Among the above-described materials, butylbishydroxyethylmethylammonium is preferably used in view of suppressing separation of the spherical particles 3 and preventing surface precipitation. For example, the above-described materials include CIL-312, CIL-512, CIL-612, CIL-R10, and the like that are commercially available from Japan Carlit Co., Ltd.

A description is provided of a flame retardant as other additive.

The flame retardant is used as other additive. The flame retardant includes metal hydrate such as aluminum hydroxide, magnesium hydroxide, calcium hydroxide, barium hydroxide, zirconium hydroxide, dolomite, hydrotalcite, and zinc hydroxystannate. Among the above-described materials, aluminum hydroxide and magnesium hydroxide improve flame retardancy of acrylic rubber. Aluminum hydroxide and magnesium hydroxide do not degrade tackiness of acrylic rubber. Hence, aluminum hydroxide and magnesium hydroxide achieve synergistic effect for improving flame retardancy and adhesiveness of the intermediate transfer belt 4. For example, aluminum hydroxide improves dispersibility to rubber and is advantageously used in view of flame retardancy and resistance to environmental change. Aluminum hydroxide is also preferable in view of affinity with bis(trifluoromethanesulfonyl)imide. For example, aluminum hydroxide includes BF013, B1403, and B703 that are commercially available from Nippon Light Metal Company, Ltd.

In view of improving flame retardancy and adhesion between the spherical particles 3 and acrylic rubber, the flame retardant described above preferably includes metal hydrate that has an average particle diameter not smaller than 0.1 μm and not greater than 10 μm, more preferably not smaller than 1.0 μm and not greater than 3 μm. The flame retardant is added in an amount not smaller than 10 parts by weight and not greater than 80 parts by weight, preferably in an amount not smaller than 30 parts by weight and not greater than 70 parts by weight. If the flame retardant is added in an amount smaller than 10 parts by weight, the flame retardant may decrease flame retardant effect. If the flame retardant is added in an amount greater than 80 parts by weight, the flame retardant may degrade flexibility of acrylic rubber.

Acrylic rubber is prepared by proper mixing methods such as roll mixing, banbury mixing, screw mixing, and solution mixing. An order of mixing is not limited. After a component that is not subject to thermal reaction and decomposition is mixed sufficiently, as a component that is subject to thermal reaction or decomposition, for example, the cross-linker or the like is mixed for a shortened time period at a temperature at which thermal reaction and decomposition do not occur.

Acrylic rubber is heated into a crosslinking substance. Acrylic rubber is heated at a temperature preferably in a range of from 130 degrees Celsius to 220 degrees Celsius and more preferably in a range of from 140 degrees Celsius to 200 degrees Celsius. A cross-linking time period is preferably in a range of from 30 seconds to 5 hours. Acrylic rubber is heated by a heating method selected properly from methods used for cross-linkage of rubber, such as heating with hot press, heating with steam, heating with an oven, and heating with hot air. After crosslinking is performed once, in order to crosslink an interior of the crosslinking substance precisely, post-crosslinking may be performed. Although a time period of post-crosslinking varies depending on a heating method, a cross-linkage temperature, a shape, and the like, post-crosslinking is preferably performed for a time period in a range of from 1 hour to 48 hours. Post-crosslinking is performed by a heating method and a heating temperature that are selected properly.

The elastic layer 2 made of rubber preferably has flexibility defined by micro rubber hardness, that is in a range of from 30 to 80, at a temperature of 25 degrees Celsius under a relative humidity (RH) of 50 percent. The micro rubber hardness is measured with a micro rubber durometer that is commercially available. For example, a micro rubber durometer MD-1 available from Kobunshi Keiki Co., Ltd. is used.

The elastic layer 2 preferably has a coating thickness not smaller than 200 μm and not greater than 600 μm, more preferably not smaller than 300 μm and not greater than 400 μm. The elastic layer 2 having a coating thickness not smaller than 200 μm preferably attains satisfactory quality of a toner image formed on a sheet having surface asperities. The elastic layer 2 having a coating thickness not greater than 600 μm preferably prevents increase in weight, susceptibility to bending, and increase in warpage that may result in unstable rotation of the intermediate transfer belt 4. The coating thickness of the elastic layer 2 is measured with the scanning electron microscope (SEM) that measures a cross section of the elastic layer 2.

A description is provided of a configuration of the spherical particles 3 mounted on a surface of the elastic layer 2.

The spherical particles 3 are made of a material that is not limited. The spherical particles 3 are made of insulative resin particles or conductive metal particles. The insulative resin particle is coated or polymerized with conductive resin or plated with metal to improve conductivity to produce a multilayer structure.

The insulative resin particle is made of acrylic resin such as polymethyl methacrylate and polymethyl acrylate, polyolefin resin such as polyethylene, polypropylene, polyisobutylene, and polybutadiene, polystyrene resin, melamine resin, silica, silicone resin, fluororesin, and the like. The conductive metal particle is made of metal such as gold, silver, copper, platinum, zinc, iron, palladium, nickel, tin, chromium, titanium, aluminum, cobalt, germanium, and cadmium and a compound such as indium tin oxide (ITO) and solder. A single type of particles or two or more types of particles may be mixed. Among the above-described materials, acrylic resin particles are preferably used because the acrylic resin particles do not separate from acrylic rubber easily and have an enhanced affinity with bis(trifluoromethanesulfonyl)imide.

The spherical particle 3 is a true spherical particle preferably in view of improving efficiency in transfer of toner of a toner image. If the spherical particle 3 does not have a true sphere shape, the spherical particle 3 may separate from the elastic layer 2 easily and therefore may not suppress separation from the elastic layer 2 effectively.

According to the embodiment of the present disclosure, the true spherical particle is defined as below.

FIGS. 1 to 3 illustrate a schematic diagram of the spherical particle 3 according to the embodiment of the present disclosure, illustrating a shape of the spherical particle 3. FIGS. 2 and 3 illustrate the spherical particle 3 that is defined by a major axis length $r_1$ in X-direction, a minor axis length $r_2$ in Y-direction, and a thickness $r_3$ in Z-direction. The major axis length $r_1$ is not smaller than the minor axis length $r_2$ that is not smaller than the thickness $r_3$ ($r_1 \geq r_2 \geq r_3$). The true spherical particle is defined by a ratio between the major axis length $r_1$ and the minor axis length $r_2$ ($r_2/r_1$) that is in a range of from 0.9 to 1.0 and a ratio between the thickness $r_3$ and the minor axis length $r_2$ ($r_3/r_2$) that is in a range of from 0.9 to 1.0.

If the ratio between the major axis length $r_1$ and the minor axis length $r_2$ ($r_2/r_1$) and the ratio between the thickness $r_3$ and the minor axis length $r_2$ ($r_3/r_2$) are smaller than 0.9, the spherical particles 3 may not be arranged or aligned on the surface of the elastic layer 2 easily, degrading efficiency in transfer of the toner of the toner image.

The major axis length $r_1$, the minor axis length $r_2$, and the thickness $r_3$ are calculated as below. For example, the spherical particles 3 are dispersed and adhered onto a smooth, measurement plane uniformly. A color laser microscope VK-8500 available from Keyence Corporation enlarges 100 particles at an arbitrary magnification (e.g., 1,000× magnification) and measures the major axis length $r_1$, the minor axis length $r_2$, and the thickness 3 of 100 particles in a unit of μm, based on which the major axis length $r_1$, the minor axis length $r_2$, and the thickness $r_3$ on average are calculated.

A description is provided of a surface condition of the intermediate transfer belt 4 according to the embodiment of the present disclosure.

FIG. 4A is an enlarged, schematic cross-sectional view of the intermediate transfer belt 4, illustrating a cross section thereof. FIG. 4B is an enlarged, schematic plan view of a surface of the intermediate transfer belt 4, that is observed from above.

As described above, the intermediate transfer belt 4 includes the base layer 1 and the elastic layer 2 that is flexible and mounted on the base layer 1. The spherical particles 3 having a uniform particle diameter define the outer face 2a serving as the outermost surface layer of the intermediate transfer belt 4. The spherical particles 3 are mounted and arranged orderly on the elastic layer 2 in the surface direction thereof such that the spherical particles 3 are embedded in the elastic layer 2 separately. The spherical particles 3 are barely superimposed in the surface direction of the elastic layer 2 and the thickness direction of the intermediate transfer belt 4. The spherical particles 3 that define the surface of the intermediate transfer belt 4 preferably have an even diameter in cross section. For example, the spherical particles 3 preferably have a profile range within an error of plus or minus of a value in a unit of μm that is calculated by multiplying an average particle diameter by 0.5.

In order to attain the even diameter of the spherical particles 3, the spherical particles 3 preferably have an identical particle diameter. However, alternatively, the spherical particles 3 may define the surface of the intermediate transfer belt 4 by a method for causing the spherical particles 3 that have a particular particle diameter to produce the surface of the intermediate transfer belt 4, thus attaining the profile range of the particle diameter.

The spherical particles 3 preferably occupy the surface of the elastic layer 2 at an occupied area rate of 60 percent or more. If the occupied area rate is smaller than 60 percent, resin may be exposed in an excessively large area. Accordingly, toner may contact rubber of the elastic layer 2 and therefore may not be transferred properly.

According to the embodiment of the present disclosure, a part of the spherical particle 3 made of resin is embedded in the elastic layer 2, preferably at an embedding rate that is greater than 50 percent and smaller than 100 percent and more preferably at an embedding rate that is not smaller than 51 percent and not greater than 90 percent. At the embedding rate greater than 50 percent, even when the image forming apparatus is used for an extended period of time, the spherical particles 3 do not separate from the elastic layer 2 easily, improving durability of the intermediate transfer belt 4. At the embedding rate smaller than 100 percent, the spherical particles 3 preferably do not decrease transfer effect of toner.

The embedding rate defines a rate of the diameter of the spherical particle 3 at which the spherical particle 3 is embedded in the elastic layer 2 in a depth direction. The embedding rate does not denote that an entirety of the spherical particles 3 has the embedding rate that is greater than 50 percent and smaller than 100 percent. The embedding rate denotes an average embedding rate that is greater than 50 percent and smaller than 100 percent, when seen from a particular view. However, in a case that the embedding rate is 50 percent, when a cross section of the intermediate transfer belt 4 is observed with an electron microscope, the spherical particles 3 embedded in the elastic layer 2 entirely are barely identified. A rate in percentage of the spherical particles 3 embedded in the elastic layer 2 entirely, that is calculated based on a number of the spherical particles 3 embedded in the elastic layer 2 with respect to a total number of the spherical particles 3, is preferably not greater than 5 percent.

The following describes a method for preparing the intermediate transfer belt 4 according to the embodiment of the present disclosure that has the configuration described above as one example.

A description is provided of a method for preparing the base layer 1.

A description is now given of the method for preparing the base layer 1 by using the coating liquid containing at least the resin component according to the embodiment of the present disclosure, that is, the coating liquid containing the polyimide resin precursor or the polyamide imide resin precursor.

While a tubular mold, for example, a tubular metal mold, rotates slowly, the coating liquid containing at least the resin component (e.g., the coating liquid containing the polyimide resin precursor or the polyamide imide resin precursor) is applied and spread with a liquid supply device such as a nozzle and a dispenser such that the coating liquid is applied evenly onto an entire outer face of the tubular mold to produce a coating film. Thereafter, the tubular mold increases a rotation speed to a predetermined speed. When the rotation speed reaches the predetermined speed, the tubular mold retains the predetermined speed, continuing rotation for a given time period. While the tubular mold rotates and increases a temperature thereof gradually, a solvent in the coating film evaporates at a temperature in a range of from approximately 80 degrees Celsius to approximately 150 degrees Celsius. In a process of evaporation, steam in an ambience (e.g., a volatilized solvent) is preferably circulated and removed efficiently. When a self-supporting film is produced, the tubular mold mounting the film is moved to a heating furnace (e.g., a firing furnace) that performs high-temperature heating processing. A temperature of the tubular mold mounting the film increases stepwise until the tubular mold mounting the film is treated with the high-temperature heating processing (e.g., firing) at a temperature in a range of from approximately 250 degrees Celsius to approximately 450 degrees Celsius eventually. The polyimide resin precursor or the polyamide imide resin precursor is treated with imidization or polyamide-imidization sufficiently. After the film is cooled sufficiently, the elastic layer 2 is layered on the base layer 1 subsequently.

A description is provided of a method for preparing the elastic layer 2.

Rubber is dissolved into an organic solvent to produce a rubber coating. The rubber coating is applied onto the base layer 1. Thereafter, the organic solvent is dried and vulcanized to produce the elastic layer 2. Like the base layer 1, the elastic layer 2 employs general coating methods such as spiral coating, die coating, and roll coating as a coating-molding method. In order to improve transfer of toner onto a rough surface of a sheet, the elastic layer 2 has an increased thickness. As a coating method for increasing the thickness of the elastic layer 2, the die coating and the spiral coating are advantageous. As described above, the spiral coating is advantageous because the spiral coating facilitates change of the thickness of the elastic layer 2 in a width direction thereof. Hence, the following describes the spiral coating. While the base layer 1 rotates in a circumferential direction thereof and a nozzle of a round type or a wide type supplies a rubber coating continuously, the nozzle moves in an axial direction of the base layer 1 and discharges the rubber coating onto the base layer 1 spirally. The rubber coating applied on the base layer 1 spirally is treated with leveling at a predetermined rotation speed and a dry temperature constantly, thus being dried. Thereafter, the rubber coating is further vulcanized (e.g., crosslinked) at a predetermined vulcanization temperature, thus producing the elastic layer 2. In order to change the thickness of the rubber coating in the width direction of the elastic layer 2, a discharge amount of the rubber coating discharged from the nozzle, a distance between the nozzle and the tubular mold, or the rotation speed of the tubular mold is changed. FIGS. 4A and 4B illustrate schematic diagrams of the intermediate transfer belt 4, respectively, that is produced as described above.

A description is provided of a method for preparing a belt surface of the intermediate transfer belt 4.

Figure 5:
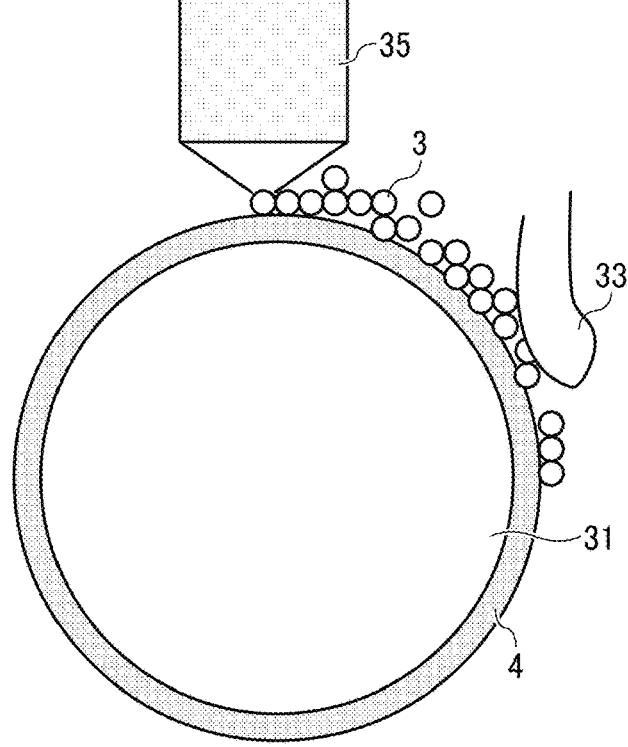
FIG. 5 is a schematic cross-sectional view of a particle application mechanism that applies particles on an elastic layer of the intermediate transfer belt depicted in FIG. 4A.

After the elastic layer 2 is vulcanized, the elastic layer 2 is cooled sufficiently. Subsequently, the spherical particles 3 are applied onto the elastic layer 2, thus obtaining the intermediate transfer belt 4 as a desired seamless belt that incorporates the spherical particles 3. As illustrated in FIG. 5, as a method for manufacturing a particle layer constructed of the spherical particles 3, a powder supply device 35 and a presser 33 are disposed opposite a mold drum 31. While the mold drum 31 rotates, the powder supply device 35 sprinkles the spherical particles 3 onto a surface of the mold drum 31 evenly. The presser 33 presses the spherical particles 3 sprinkled on the surface of the mold drum 31 against the mold drum 31 under predetermined pressure. The presser 33 embeds the spherical particles 3 into the elastic layer 2 made of resin and removes redundant spherical particles 3. The intermediate transfer belt 4 according to the embodiment of the present disclosure employs the spherical particles 3 as monodisperse particles. A simple process of leveling the spherical particles 3 with the presser 33 produces a single particle layer that is even. The embedding rate of the spherical particles 3 is adjusted by changing a time period for which the presser 33 presses the spherical particles 3 against the mold drum 31.

The embedding rate of the spherical particles 3 embedded into the elastic layer 2 may be adjusted by other methods. For example, the embedding rate of the spherical particles 3 is adjusted readily by increasing or decreasing pressure applied by the presser 33. For example, adjustment of the embedding rate varies depending on viscosity of the cast, coating liquid, a solid content, a usage amount of a solvent, a material of the spherical particle 3, and the like. As a guide, with respect to the cast, coating liquid having a viscosity in a range of from 100 mPa's to 100,000 mPa·s, pressure applied by the presser 33 is in a range of from 1 $mN/cm^2$ to 1,000 $mN/cm^2$, thus attaining the embedding rate described above that is greater than 50 percent and smaller than 100 percent relatively readily.

After the spherical particles 3 are arranged on the surface of the elastic layer 2 evenly, while the mold drum 31 rotates, the spherical particles 3 are heated for a predetermined time period at a predetermined temperature. Thus, the spherical particles 3 are hardened and the elastic layer 2 embedded with the spherical particles 3 is produced. After the elastic layer 2 is cooled sufficiently, the elastic layer 2 is removed from the mold drum 31 together with the base layer 1, thus obtaining the intermediate transfer belt 4 as the desired seamless belt.

A description is provided of a method for measuring the embedding rate of the spherical particles 3 of the intermediate transfer belt 4.

The method for measuring the embedding rate of the spherical particles 3 of the intermediate transfer belt 4 is not limited and is selected properly according to an objective. For example, the embedding rate of the spherical particles 3 is measured by observing a cross section of the intermediate transfer belt 4 with the scanning electron microscope (SEM).

A description is provided of a construction of an image forming apparatus according to an embodiment of the present disclosure.

The image forming apparatus according to the embodiment of the present disclosure includes an image bearer, a developing device, an intermediate transfer belt, a primary transfer device, and a secondary transfer device. The image bearer bears a latent image and a toner image. The developing device develops the latent image formed on the image bearer into the toner image with toner. The primary transfer device primarily transfers the toner image developed by the developing device onto the intermediate transfer belt. The secondary transfer device secondarily transfers the toner image formed on the intermediate transfer belt onto a recording medium. The image forming apparatus further includes other elements selected properly, for example, a discharger, a cleaner, a recycling device, and a controller.

Preferably, the image forming apparatus is a full color image forming apparatus that includes a plurality of image bearers. The image bearers bear latent images, respectively. The image bearers are disposed opposite developing devices that contain yellow, magenta, cyan, and black toners, respectively. The image bearers are arranged in line.

Referring to schematic diagrams illustrating a main section of the image forming apparatus, the following describes a configuration of a seamless belt incorporated in a belt section of the image forming apparatus according to embodiments of the present disclosure in detail.

The schematic diagrams are examples and the technology of the present disclosure is not limited to the embodiments described below.

Figure 6:
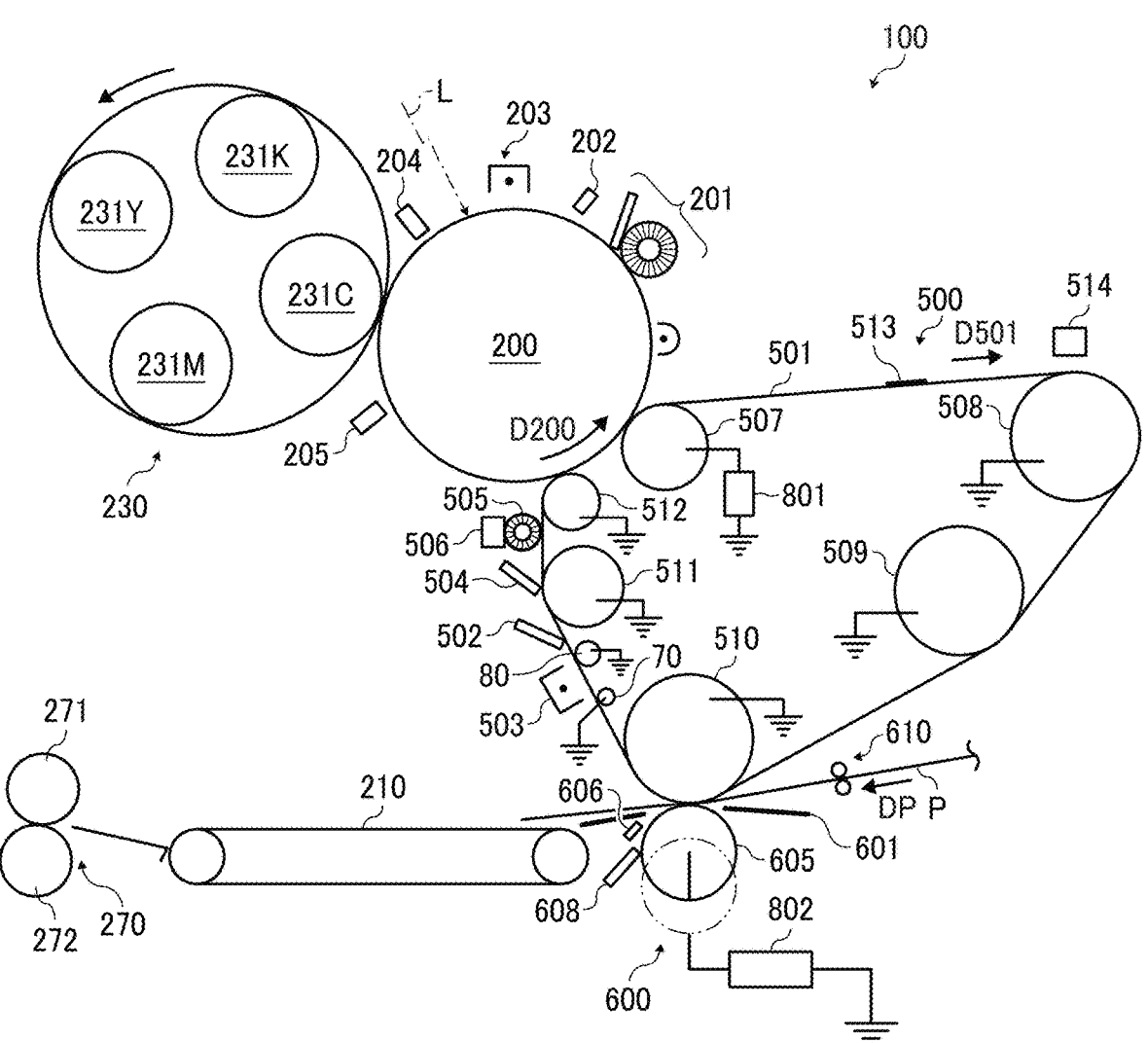
FIG. 6 is a schematic cross-sectional view of an image forming apparatus according to an embodiment of the present disclosure.

FIG. 6 is a schematic diagram of an image forming apparatus 100, illustrating a main section thereof. The image forming apparatus 100 includes a seamless belt serving as a belt. The seamless belt is an intermediate transfer belt applied with the technology of the present disclosure.

As illustrated in FIG. 6, the image forming apparatus 100 includes a photoconductive drum 200, an intermediate transfer unit 500 that includes the belt, and a secondary transfer unit 600. The intermediate transfer unit 500 includes an intermediate transfer belt 501 serving as an intermediate transferor that is stretched taut across a plurality of rollers. The intermediate transfer belt 501 is surrounded by and disposed opposite a secondary transfer bias roller 605, a belt cleaning blade 504, a lubricant application brush 505, and the like. The secondary transfer bias roller 605 serves as a secondary transfer electric charge applicator of the secondary transfer unit 600, that applies an electric charge to the intermediate transfer belt 501. The belt cleaning blade 504 serves as an intermediate transfer belt cleaner that cleans the intermediate transfer belt 501. The lubricant application brush 505 serves as a lubricant applicator that applies a lubricant to the intermediate transfer belt 501.

A position detection mark is mounted on an outer circumferential face or an inner circumferential face of the intermediate transfer belt 501. In a case that the position detection mark is mounted on the outer circumferential face of the intermediate transfer belt 501, the position detection mark is disposed outboard from a passing region on the intermediate transfer belt 501 where the intermediate transfer belt 501 passes over the belt cleaning blade 504. Hence, the position detection mark is mounted on a restricted area on the outer circumferential face of the intermediate transfer belt 501. To address the circumstance, the position detection mark may be mounted on the inner circumferential face of the intermediate transfer belt 501. The intermediate transfer unit 500 further includes an optical sensor 514, a primary transfer bias roller 507, and a belt driving roller 508. The optical sensor 514 serves as a mark detecting sensor that detects the position detection mark on the intermediate transfer belt 501. The optical sensor 514 is interposed between the primary transfer bias roller 507 and the belt driving roller 508 across which the intermediate transfer belt 501 is looped.

The intermediate transfer unit 500 further includes a belt tension roller 509, a secondary transfer opposed roller 510, a cleaner opposed roller 511, and a feedback electric current detection roller 512. The intermediate transfer belt 501 is stretched taut across the primary transfer bias roller 507 serving as a primary transfer electric charge applicator, the belt driving roller 508, the belt tension roller 509, the secondary transfer opposed roller 510, the cleaner opposed roller 511, and the feedback electric current detection roller 512. Each of the primary transfer bias roller 507, the belt driving roller 508, the belt tension roller 509, the secondary transfer opposed roller 510, the cleaner opposed roller 511, and the feedback electric current detection roller 512 is made of a conductive material. Each of the belt driving roller 508, the belt tension roller 509, the secondary transfer opposed roller 510, the cleaner opposed roller 511, and the feedback electric current detection roller 512 is grounded. The image forming apparatus 100 further includes a primary transfer power supply 801 that is controlled under a constant current control or a constant voltage control. The primary transfer power supply 801 applies a transfer bias to the primary transfer bias roller 507. The transfer bias is controlled to a current or a voltage having a predetermined magnitude according to a number of toner images superimposed on the intermediate transfer belt 501.

The intermediate transfer unit 500 further includes a driving motor that drives and rotates the belt driving roller 508. The belt driving roller 508 drives and rotates the intermediate transfer belt 501 in a rotation direction D501.

The intermediate transfer belt 501 serving as the belt is usually made of a semiconductor or an insulator. The intermediate transfer belt 501 is constructed of a single layer or a plurality of layers. According to the embodiment, the intermediate transfer belt 501 is preferably a seamless belt that improves durability and image formation. The intermediate transfer belt 501 has a size greater than a size of a maximum sheet that is available in the image forming apparatus 100 so that toner images formed on the photoconductive drum 200 are superimposed on the intermediate transfer belt 501. The intermediate transfer unit 500 further includes a charger 503 that charges the intermediate transfer belt 501, a discharging roller 70 that discharges the intermediate transfer belt 501, and a ground roller 80 that grounds the intermediate transfer belt 501.

The image forming apparatus 100 further includes a contact and separation mechanism described below. The contact and separation mechanism brings the secondary transfer bias roller 605 serving as a secondary transferor into contact with or separation from the outer circumferential face of the intermediate transfer belt 501 at a stretched portion thereof that is disposed opposite and stretched by the secondary transfer opposed roller 510. The secondary transfer bias roller 605 and the stretched portion of the intermediate transfer belt 501 sandwich a transfer sheet P serving as a recording medium. The image forming apparatus 100 further includes a secondary transfer power supply 802 that is controlled under the constant current control. The secondary transfer power supply 802 applies a transfer bias having a predetermined electric current.

The image forming apparatus 100 further includes a registration roller pair 610 that conveys the transfer sheet P serving as a transfer material to a secondary transfer nip formed between the secondary transfer bias roller 605 and the stretched portion of the intermediate transfer belt 501 at a predetermined time. The secondary transfer unit 600 further includes a cleaning blade 608 serving as a cleaner that contacts the secondary transfer bias roller 605. The cleaning blade 608 removes an adhered substance adhered to a surface of the secondary transfer bias roller 605 therefrom, thus cleaning the surface of the secondary transfer bias roller 605.

The image forming apparatus 100 further includes a driving motor that rotates the photoconductive drum 200. With the above-described construction of the image forming apparatus 100 as a color copier, as the image forming apparatus 100 starts a series of image forming processes (e.g., a print job), the driving motor rotates the photoconductive drum 200 counterclockwise in FIG. 6 in a rotation direction D200. A black (Bk) toner image, a cyan (C) toner image, a magenta (M) toner image, and a yellow (Y) toner image are formed on the photoconductive drum 200. The belt driving roller 508 rotates the intermediate transfer belt 501 clockwise in FIG. 6 in the rotation direction D501. As the intermediate transfer belt 501 rotates in the rotation direction D501, the primary transfer bias roller 507 applies a transfer bias, that is generated by a voltage applied to the primary transfer bias roller 507, to the intermediate transfer belt 501, thus primarily transferring the black, cyan, magenta, and yellow toner images formed on the photoconductive drum 200 onto the intermediate transfer belt 501. Accordingly, the black, cyan, magenta, and yellow toner images are superimposed on the intermediate transfer belt 501 successively.

A description is provided of formation of the black toner image as one example.

As illustrated in FIG. 6, the image forming apparatus 100 further includes a charger 203 and an electric potential sensor 204. The charger 203 uniformly charges a surface of the photoconductive drum 200 at a predetermined electric potential with negative electric charge by corona discharge. The electric potential sensor 204 detects an electric potential of the photoconductive drum 200. The image forming apparatus 100 further includes an optical writing unit. The optical writing unit exposes the charged surface of the photoconductive drum 200 by raster scanning with a laser beam L based on a black image signal at a time determined based on a detection signal from the optical sensor 514 that detects the position detection mark on the intermediate transfer belt 501. When the optical writing unit exposes the charged surface of the photoconductive drum 200 by raster scanning, an exposed portion on the uniformly charged surface of the photoconductive drum 200 loses electric charge in an amount proportional to an amount of exposure. Thus, an electrostatic latent image to be developed into a black toner image is formed on the surface of the photoconductive drum 200. The image forming apparatus 100 further includes a revolver developing unit 230 including a black developing device 231K, a cyan developing device 231C, a magenta developing device 231M, and a yellow developing device 231Y, each of which includes a developing roller. The developing roller of the black developing device 231K bears black toner that is negatively charged. As the black toner contacts the electrostatic latent image on the photoconductive drum 200, the black toner does not adhere to an electric charge bearing portion of the photoconductive drum 200 where electric charge remains. Accordingly, the black toner is attracted to the exposed portion that does not bear electric charge, forming the black toner image analogous to the electrostatic latent image on the photoconductive drum 200. The image forming apparatus 100 further includes an image density sensor 205 that detects a density of the black toner image.

The primary transfer bias roller 507 primarily transfers the black toner image formed on the photoconductive drum 200 onto the outer circumferential face of the intermediate transfer belt 501 that contacts the photoconductive drum 200 and rotates at a uniform velocity. The image forming apparatus 100 further includes a photoconductive drum cleaner 201. The photoconductive drum cleaner 201 removes slight residual toner that is failed to be primarily transferred onto the intermediate transfer belt 501 and therefore remains on the surface of the photoconductive drum 200 before the photoconductive drum 200 is used again. After formation of the black toner image on the photoconductive drum 200, formation of a cyan toner image starts. The image forming apparatus 100 further includes a color scanner. The color scanner starts reading an image on an original at a predetermined time, creating cyan image data. The optical writing unit exposes the surface of the photoconductive drum 200 with a laser beam L according to the cyan image data, forming an electrostatic latent image to be developed into the cyan toner image on the surface of the photoconductive drum 200.

After a trailing end of the electrostatic latent image to be developed into the black toner image passes through the revolver developing unit 230, before a leading end of the electrostatic latent image to be developed into the cyan toner image reaches the revolver developing unit 230, the revolver developing unit 230 rotates to place the cyan developing device 231C to a developing position where the cyan developing device 231C develops the electrostatic latent image on the photoconductive drum 200 with cyan toner. Thereafter, the cyan developing device 231C continues developing the electrostatic latent image into the cyan toner image. When a trailing end of the electrostatic latent image developed into the cyan toner image passes over the revolver developing unit 230, the revolver developing unit 230 rotates similarly to rotation thereof to move the black developing device 231K as described above, thus moving the magenta developing device 231M to the developing position subsequently. The revolver developing unit 230 finishes moving the magenta developing device 231M before a leading end of the electrostatic latent image to be developed into the yellow toner image reaches the developing position subsequently. In order to form the magenta toner image and the yellow toner image, processes for reading the image on the original into magenta image data and yellow image data, forming electrostatic latent images, and developing the electrostatic latent images into the magenta toner image and the yellow toner image, respectively, are performed similarly to processes for forming the black toner image and the cyan toner image as described above. Hence, a description of the processes for forming the magenta toner image and the yellow toner image is omitted.

The primary transfer bias roller 507 primarily transfers the black, cyan, magenta, and yellow toner images formed on the photoconductive drum 200 successively as described above onto the outer circumferential face of the intermediate transfer belt 501 such that the black, cyan, magenta, and yellow toner images are superimposed on the outer circumferential face of the intermediate transfer belt 501. Thus, the intermediate transfer belt 501 bears a color toner image 513 created by superimposing the toner images in maximum four colors. When the image forming apparatus 100 starts the image forming processes described above, a transfer sheet P is conveyed from a sheet feeder such as a sheet tray or a bypass tray to the registration roller pair 610. The registration roller pair 610 temporarily halts the transfer sheet P at a nip formed by two rollers of the registration roller pair 610.

The secondary transfer nip is formed between the secondary transfer bias roller 605 and the stretched portion of the intermediate transfer belt 501, that is stretched by the secondary transfer opposed roller 510. The registration roller pair 610 resumes rotation to convey the transfer sheet P to the secondary transfer nip such that a leading end of the transfer sheet P meets a leading end of the color toner image 513 formed on the intermediate transfer belt 501 at an entry to the secondary transfer nip. The secondary transfer unit 600 further includes a transfer sheet guide plate 601. As the transfer sheet P is conveyed along the transfer sheet guide plate 601, registration of the transfer sheet P and the color toner image 513 is performed.

While the transfer sheet P passes through the secondary transfer nip, the secondary transfer power supply 802 applies a voltage to the secondary transfer bias roller 605 to generate a transfer bias that secondarily transfers the black, cyan, magenta, and yellow toner images constituting the full color toner image 513 formed on the intermediate transfer belt 501 onto the transfer sheet P collectively. The transfer sheet P is conveyed along the transfer sheet guide plate 601.

The secondary transfer unit 600 further includes a transfer sheet discharger 606 that is disposed downstream from the secondary transfer nip in a sheet conveyance direction DP. The transfer sheet discharger 606 includes a static charge eliminator. The image forming apparatus 100 further includes a belt conveyor 210 and a fixing device 270. While the transfer sheet P passes through an opposed position disposed opposite the transfer sheet discharger 606, the transfer sheet discharger 606 discharges the transfer sheet P. Thereafter, the belt conveyor 210 including a belt conveys the transfer sheet P to the fixing device 270. The fixing device 270 includes a fixing roller 271 and a pressure roller 272 that presses against the fixing roller 271 to form a nip therebetween. The fixing roller 271 and the pressure roller 272 melt and fix the color toner image 513 on the transfer sheet P. The image forming apparatus 100 further includes an output roller pair and an output tray. The output roller pair ejects the transfer sheet P bearing the fixed color toner image 513 onto an outside of an apparatus body of the image forming apparatus 100. Thus, the transfer sheet P is stacked on the output tray such that the transfer sheet P faces up. Alternatively, the fixing device 270 may include a belt.

The image forming apparatus 100 further includes a discharge lamp 202. After the black, cyan, magenta, and yellow toner images formed on the photoconductive drum 200 are transferred onto the intermediate transfer belt 501, the photoconductive drum cleaner 201 cleans the surface of the photoconductive drum 200. The discharge lamp 202 uniformly discharges the surface of the photoconductive drum 200. After the black, cyan, magenta, and yellow toner images formed on the intermediate transfer belt 501 are secondarily transferred onto the transfer sheet P, the belt cleaning blade 504 removes residual toner failed to be transferred onto the transfer sheet P and therefore remaining on the outer circumferential face of the intermediate transfer belt 501 therefrom. The image forming apparatus 100 further includes a cleaner contact and separation mechanism that brings the belt cleaning blade 504 into contact with or separation from the outer circumferential face of the intermediate transfer belt 501 at a predetermined time.

The intermediate transfer unit 500 further includes a toner seal 502 that is disposed upstream from the belt cleaning blade 504 in the rotation direction D501 of the intermediate transfer belt 501. The toner seal 502 comes into contact with and separates from the outer circumferential face of the intermediate transfer belt 501. While the belt cleaning blade 504 removes the residual toner from the intermediate transfer belt 501, the toner seal 502 receives the residual toner dropped from the belt cleaning blade 504, preventing the dropped toner from scattering onto a conveyance path through which the transfer sheet P is conveyed. The cleaner contact and separation mechanism brings the toner seal 502 and the belt cleaning blade 504 into contact with and separation from the outer circumferential face of the intermediate transfer belt 501.

The lubricant application brush 505 scrapes off a lubricant 506 and applies the lubricant 506 onto the outer circumferential face of the intermediate transfer belt 501 from which the belt cleaning blade 504 removes the residual toner. For example, the lubricant 506 is a solid made of zinc stearate or the like. The lubricant 506 contacts the lubricant application brush 505. The intermediate transfer unit 500 further includes a belt discharge brush that contacts the outer circumferential face of the intermediate transfer belt 501. The belt discharge brush applies a discharge bias to the intermediate transfer belt 501 to remove residual electric charge remaining on the outer circumferential face of the intermediate transfer belt 501 therefrom. The intermediate transfer unit 500 further includes contact and separation mechanisms, respectively, that bring the lubricant application brush 505 and the belt discharge brush into contact with or separation from the outer circumferential face of the intermediate transfer belt 501 at a predetermined time.

When the image forming apparatus 100 receives a print job to form toner images on a plurality of transfer sheets P, respectively, after the color scanner reads the image on the original into the yellow image data and the yellow toner image, as a toner image in a fourth color, is formed on the photoconductive drum 200 and transferred onto a first transfer sheet P, image formation starts for a toner image in black as a first color on a second transfer sheet P at a predetermined time. After the secondary transfer bias roller 605 secondarily transfers the black, cyan, magenta, and yellow toner images superimposed on the intermediate transfer belt 501 onto the first transfer sheet P collectively, the primary transfer bias roller 507 primarily transfers the black toner image to be transferred onto the second transfer sheet P onto a cleaned region on the outer circumferential face of the intermediate transfer belt 501, that is cleaned by the belt cleaning blade 504. Thereafter, the image forming processes described above for the first transfer sheet P are performed for the second transfer sheet P similarly. The above describes the image forming processes in a four-color copy mode in which a full color toner image is formed by using four colors of black, cyan, magenta, and yellow. When the image forming apparatus 100 performs image formation in a three-color copy mode or a two-color copy mode, the image forming apparatus 100 performs the image forming processes described above according to specified colors and a specified number of copies. When the image forming apparatus 100 performs image formation in a monochrome copy mode, until image formation on a specified number of transfer sheets P finishes, the revolver developing unit 230 causes one of the black developing device 231K, the cyan developing device 231C, the magenta developing device 231M, and the yellow developing device 231Y, that is specified, to develop an electrostatic latent image. The belt cleaning blade 504 continues contacting the intermediate transfer belt 501.

Figure 7:
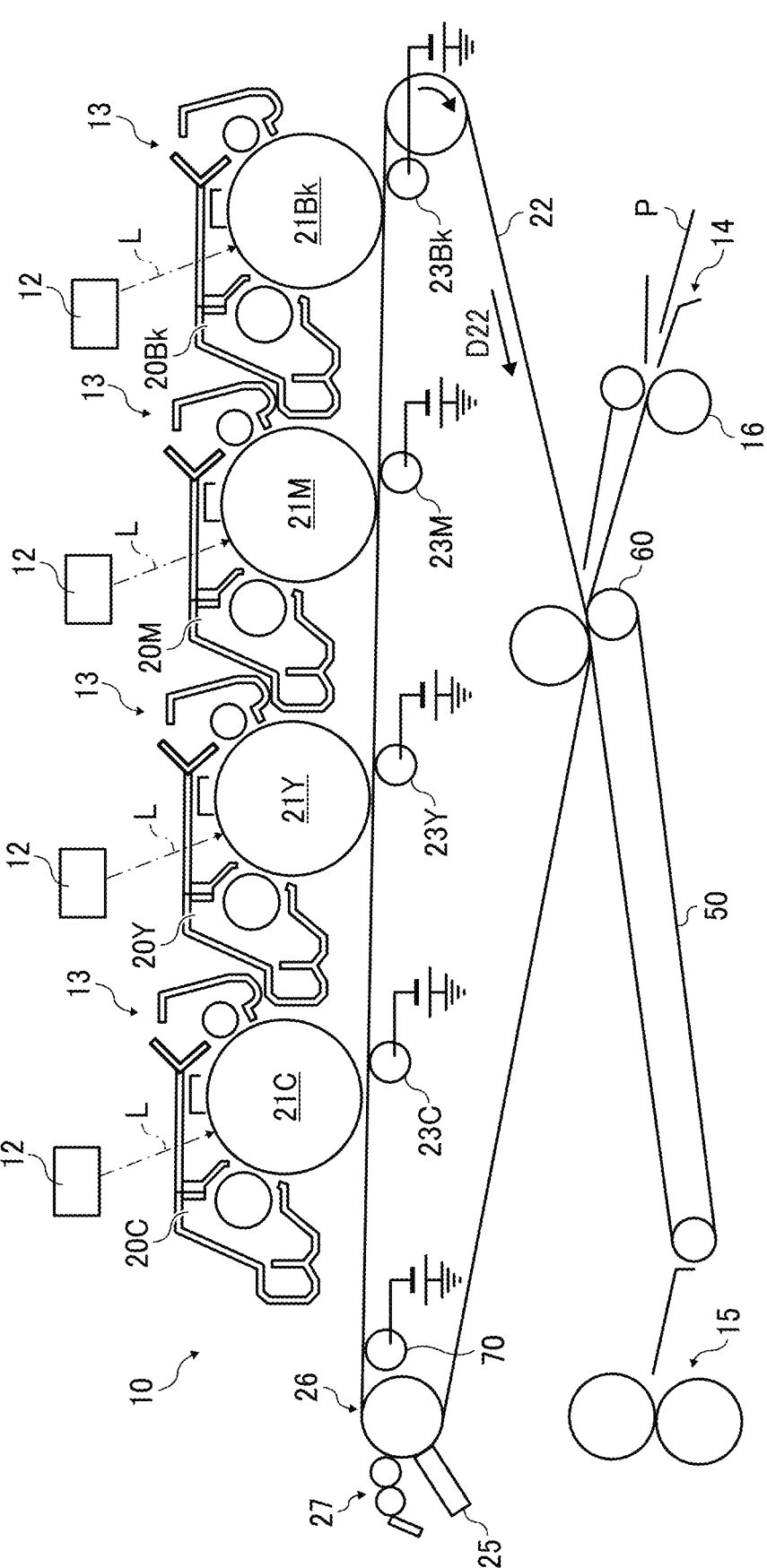
FIG. 7 is a schematic cross-sectional view of an image forming apparatus according to another embodiment of the present disclosure.

The above describes the construction and operation of the image forming apparatus 100 as a copier according to the embodiment of the present disclosure, that incorporates the single photoconductive drum 200. The technology of the present disclosure is also applied to an image forming apparatus incorporating a plurality of photoconductive drums as illustrated in FIG. 7, for example. FIG. 7 is a schematic diagram of an image forming apparatus 100A, illustrating a main section thereof, as one example. The image forming apparatus 100A includes a plurality of photoconductive drums 21Bk, 21M, 21Y, and 21C arranged along a single, intermediate transfer belt 22 as a seamless belt.

FIG. 7 illustrates the image forming apparatus 100A as a four-drum type, digital color printer that incorporates the four photoconductive drums 21Bk, 21M, 21Y, and 21C used to form toner images in four different colors, that is, black, magenta, yellow, and cyan, as one example.

As illustrated in FIG. 7, the image forming apparatus 100A includes a printer body 10 that accommodates image writers 12, image forming devices 13, and a sheet feeder 14 that form a color toner image on a transfer sheet P by electrophotography. The image forming apparatus 100A further includes an image processor that performs image processing according to image signals that are converted into chrominance signals for forming electrostatic latent images to be developed into black (Bk), magenta (M), yellow (Y), and cyan (C) toner images, respectively. The image processor sends the chrominance signals to the image writers 12. For example, each of the image writers 12 is a laser scanning optical system that includes a laser light source, a deflector such as a polygon mirror, a scan imaging optical system, and mirrors. The image writers 12 include four writing optical paths that correspond to the chrominance signals, respectively. The image writers 12 write electrostatic latent images onto the photoconductive drums 21Bk, 21M, 21Y, and 21C of the image forming devices 13 according to the chrominance signals, respectively. The photoconductive drums 21Bk, 21M, 21Y, and 21C are photoconductors serving as image bearers, respectively.

The image forming devices 13 include the photoconductive drums 21Bk, 21M, 21Y, and 21C serving as the image bearers that bear the black, magenta, yellow, and cyan toner images, respectively. Each of the photoconductive drums 21Bk, 21M, 21Y, and 21C usually employs an organic photoconductor (OPC). The photoconductive drums 21Bk, 21M, 21Y, and 21C are surrounded by chargers, exposure devices of the image writers 12, developing devices 20Bk, 20M, 20Y, and 20C, primary transfer bias rollers 23Bk, 23M, 23Y, and 23C, cleaners, and dischargers, respectively. The exposure devices of the image writers 12 emit laser beams L onto the photoconductive drums 21Bk, 21M, 21Y, and 21C, respectively. The developing devices 20Bk, 20M, 20Y, and 20C contain black, magenta, yellow, and cyan toners, respectively. The primary transfer bias rollers 23Bk, 23M, 23Y, and 23C serve as primary transferors, respectively. The developing devices 20Bk, 20M, 20Y, and 20C employ a two-component developing method using a magnetic brush. The image forming apparatus 100A further includes a driving roller 26 that drives and rotates the intermediate transfer belt 22 in a rotation direction D22. The intermediate transfer belt 22 serving as the belt is interposed between the photoconductive drums 21Bk, 21M, 21Y, and 21C and the primary transfer bias rollers 23Bk, 23M, 23Y, and 23C, respectively. The black, magenta, yellow, and cyan toner images formed on the photoconductive drums 21Bk, 21M, 21Y, and 21C, respectively, are transferred onto the intermediate transfer belt 22 successively such that the black, magenta, yellow, and cyan toner images are superimposed on the intermediate transfer belt 22.

The image forming apparatus 100A further includes a registration roller pair 16, a transfer sheet conveyance belt 50, a secondary transfer bias roller 60, and a fixing device 15. After a transfer sheet P is fed from the sheet feeder 14, the registration roller pair 16 conveys the transfer sheet P to the transfer sheet conveyance belt 50 as a belt. The intermediate transfer belt 22 contacts the transfer sheet conveyance belt 50 to form a secondary transfer nip therebetween. While the transfer sheet P is conveyed through the secondary transfer nip, the secondary transfer bias roller 60 serving as a secondary transferor secondarily transfers the black, magenta, yellow, and cyan toner images formed on the intermediate transfer belt 22 onto the transfer sheet P collectively. Thus, a color toner image is formed on the transfer sheet P. The transfer sheet conveyance belt 50 conveys the transfer sheet P bearing the color toner image to the fixing device 15. The fixing device 15 fixes the color toner image on the transfer sheet P. Thereafter, the transfer sheet P is ejected onto an outside of the printer body 10.

The image forming apparatus 100A further includes a belt cleaner 25, a lubrication device 27, and a discharging roller 70. The belt cleaner 25 removes residual toner failed to be secondarily transferred onto the transfer sheet P and therefore remaining on the intermediate transfer belt 22 therefrom. The lubrication device 27 is disposed downstream from the belt cleaner 25 in the rotation direction D22 of the intermediate transfer belt 22. The lubrication device 27 includes a solid lubricant and a conductive brush. The conductive brush slides over the intermediate transfer belt 22 and applies the solid lubricant onto the intermediate transfer belt 22. The conductive brush contacts the intermediate transfer belt 22 constantly to apply the solid lubricant to the intermediate transfer belt 22. The solid lubricant improves cleaning of the intermediate transfer belt 22, preventing filming and enhancing durability of the intermediate transfer belt 22.

A description is provided of embodiments of the present disclosure.

The following describes the technology of the present disclosure in detail with the embodiments. However, the technology of the present disclosure is not limited to the embodiments described below. The technology of the present disclosure also encompasses proper modifications of the embodiments described below unless the modifications deviate from the scope of the present disclosure.

In the description below, parts denote parts by weight and percent denotes percent by mass unless otherwise specified.

A description is provided of an embodiment 1.

A coating liquid for a base layer (e.g., the base layer 1) was prepared as described below. The base layer of a belt (e.g., the intermediate transfer belt 4) serving as a seamless belt was prepared with the coating liquid.

A description is provided of preparation of the coating liquid for the base layer.

A polyimide varnish included a polyimide resin precursor as a main ingredient and was U-Varnish A available from UBE Corporation. A dispersion liquid included carbon black dispersed in N-methyl-2-pyrrolidone with a bead mill in advance. The carbon black was Special Black 4 available from Evonik Industries AG. The dispersion liquid was mixed with the polyimide varnish such that a content by percentage of the carbon black was 17 percent of a polyamic acid solid content. The dispersion liquid and the polyimide varnish were mixed and agitated sufficiently to prepare a coating liquid A1 for the base layer.

A description is provided of preparation of the belt including the base layer made of polyimide.

A tubular support was made of metal and had an outer surface having an outer diameter of 500 mm and a length of 400 mm. The outer surface was roughened by blasting. The tubular support was used as a mold and installed in a roll coater.

Subsequently, the coating liquid A1 for the base layer was poured into a pan. An application roller that rotated at a rotation speed of 40 mm/sec scooped up the coating liquid A1 for the base layer. A regulation roller was disposed opposite the application roller with a gap of 0.6 mm therebetween to control a thickness of the coating liquid A1 for the base layer applied on the application roller.

Thereafter, the tubular support was controlled to rotate at a rotation speed of 35 mm/sec and was moved toward the application roller. In a state in which the tubular support was disposed opposite the application roller with a gap of 0.4 mm therebetween, the application roller transferred and applied the coating liquid A1 onto the tubular support evenly. Thereafter, while the tubular support continued rotation, the tubular support was installed in a hot air circulation dryer. A temperature of the tubular support was increased gradually to 110 degrees Celsius at which the tubular support was heated for 30 minutes. The temperature of the tubular support was increased further to 200 degrees Celsius at which the tubular support was heated for 30 minutes and the tubular support stopped rotation. Thereafter, the tubular support was guided to a heating furnace (e.g., a firing furnace) that performed high-temperature heating processing. The temperature of the tubular support was increased stepwise to 320 degrees Celsius at which the tubular support was heated (e.g., fired) for 60 minutes. The tubular support was cooled sufficiently, obtaining a belt A2 including the base layer made of polyimide that had a coating thickness of 60 μm.

A description is provided of preparation of an elastic layer to be mounted on the base layer made of polyimide.

Components were mixed and kneaded with a prescription described below to prepare a rubber composition.

The components included 100 parts of acrylic rubber Nipol AR12 available from Zeon Corporation, 1 part of stearic acid that was stearic acid (beads) Tsubaki™ available from NOF Corporation, 60 parts of a flame retardant containing magnesium hydroxide KISUMA5 available from Kyowa Chemical Corporation, 0.6 parts of a cross-linker containing hexamethylene diamine carbamate Diak™ No. 1 available from DuPont de Nemours, Inc., 0.6 parts of a cross-linking promoter VULCOFAC ACT55 (70% occupied by salt as a combination of 1,8-diazabicyclo [5.4.0]-7-undecene and diprotic acid and 30% occupied by amorphous silica) available from Safic-Alcan SAS, and 0.3 parts of an ion conductant containing butyl-3-methylpyridinium bis(trifluoromethanesulfonyl)imide CIL-312 available from Japan Carlit Co., Ltd.

Subsequently, the rubber composition obtained as described above was dissolved in an organic solvent containing methyl isobutyl ketone (MIBK) to prepare a rubber solution having a solid content of 35 percent. While the tubular support mounting the base layer made of polyimide, that had been prepared, rotated, the rubber solution prepared as described above coated the base layer made of polyimide. For example, while a nozzle ejected the rubber solution onto the base layer continuously, the nozzle moved in an axial direction of the tubular support, thus coating the base layer with the rubber solution spirally. The rubber solution coated the base layer in an amount that created a coating thickness of 400 μm eventually. Thereafter, while the tubular support coated with the rubber solution rotated, the tubular support was installed in the hot air circulation dryer. The temperature of the tubular support was increased to 90 degrees Celsius at a temperature increase speed of 4 degrees Celsius per minute. The tubular support was heated for 30 minutes at 90 degrees Celsius.

Subsequently, spherical particles (e.g., spherical resin particles) made of melamine that had an average particle diameter of 1.2 μm were sprinkled evenly onto a surface of the rubber composition heated by the method described above with reference to FIG. 5. The spherical particles were Epostar® S12 available from Nippon Shokubai Co., Ltd. A presser, that is, a blade made of polyurethan rubber, pressed the spherical particles against the elastic layer with pressure of 100 mN/cm² so that the elastic layer retained the spherical particles. Subsequently, the tubular support was installed in the hot air circulation dryer again. The temperature of the tubular support was increased to 170 degrees Celsius at the temperature increase speed of 4 degrees Celsius per minute. The tubular support was heated for 60 minutes at 170 degrees Celsius, obtaining an intermediate transfer belt A.

A description is provided of an embodiment 2.

Magnesium hydroxide used in the embodiment 1 was replaced by aluminum hydroxide BF-013 available from Nippon Light Metal Company, Ltd. Other configuration of the embodiment 2 was similar to the configuration of the embodiment 1. Thus, an intermediate transfer belt B was obtained.

A description is provided of an embodiment 3.

The spherical particles made of melamine used in the embodiment 1 were replaced by spherical particles made of acryl Techpolymer® SSX-101 available from Sekisui Kasei Co., Ltd. Other configuration of the embodiment 3 was similar to the configuration of the embodiment 1. Thus, an intermediate transfer belt C was obtained.

A description is provided of an embodiment 4.

The ion conductant used in the embodiment 1 was replaced by butylbishydroxyethylmethylammonium bis(trifluoromethanesulfonyl)imide CIL-R10 available from Japan Carlit Co., Ltd. Other configuration of the embodiment 4 was similar to the configuration of the embodiment 1. Thus, an intermediate transfer belt D was obtained.

A description is provided of an embodiment 5.

The flame retardant used in the embodiment 3 was replaced by aluminum hydroxide BF-013 available from Nippon Light Metal Company, Ltd. The ion conductant used in the embodiment 3 was replaced by butylbishydroxyethylmethylammonium•bis(trifluoromethanesulfonyl)imide CIL-R10 available from Japan Carlit Co., Ltd. Other configuration of the embodiment 5 was similar to the configuration of the embodiment 3. Thus, an intermediate transfer belt E was obtained.

A description is provided of a comparative example 1.

The ion conductant used in the embodiment 1 was replaced by tetrabutylammonium perchlorate QAP-01 available from Japan Carlit Co., Ltd. Other configuration of the comparative example 1 was similar to the configuration of the embodiment 1. Thus, an intermediate transfer belt F was obtained.

A description is provided of a comparative example 2.

The prescription of the rubber composition used in the embodiment 1 was changed to a prescription that included 100 parts of acrylonitrile-butadiene rubber Nipol DN302 available from Zeon Corporation, 1 part of stearic acid that was stearic acid (beads) Tsubaki™ available from NOF Corporation, 3 parts of peroxide PERCUMYL® 40 available from NOF Corporation, 5 parts of zinc oxide No. 2 available from Sakai Chemical Industry Co., Ltd., 60 parts of a flame retardant that was magnesium hydroxide KISUMA5 available from Kyowa Chemical Corporation, and 0.3 parts of an ion conductant that was butyl-3-methylpyridinium•bis(trifluoromethanesulfonyl)imide CIL-312 available from Japan Carlit Co., Ltd.

Subsequently, the rubber composition obtained as described above was dissolved in a cyclohexanone to prepare a rubber solution having a solid content of 35 percent. While the tubular support mounting the base layer made of polyimide, that had been prepared, rotated, the prepared rubber solution coated the base layer made of polyimide. For example, while the nozzle ejected the rubber solution onto the base layer continuously, the nozzle moved in the axial direction of the tubular support, thus coating the base layer with the rubber solution spirally. The rubber solution coated the base layer in an amount that created the coating thickness of 400 μm eventually. Thereafter, while the tubular support coated with the rubber solution rotated, the tubular support was installed in the hot air circulation dryer. The temperature of the tubular support was increased to 90 degrees Celsius at the temperature increase speed of 4 degrees Celsius per minute. The tubular support was heated for 30 minutes at 90 degrees Celsius. Subsequent processes of the comparative example 2 were similar to the processes of the embodiment 1. Thus, an intermediate transfer belt G was obtained.

A description is provided of evaluations of the embodiments 1 to 5 and the comparative examples 1 and 2.

A description is provided of an evaluation of a white spot streak in portrait orientation (e.g., a sheet conveyance direction in which the transfer sheet P is conveyed in the image forming apparatus 100A).

The intermediate transfer belts A, B, C, D, E, F, and G according to the embodiments 1 to 5 and the comparative examples 1 and 2, respectively, were installed in the image forming apparatus 100A depicted in FIG. 7. 20,000 coated sheets (e.g., coated paper) having an A4 size were conveyed through the image forming apparatus 100A. The coated sheets were thick paper having edges that might separate the spherical particles from each of the intermediate transfer belts A, B, C, D, E, F, and G easily. The coated sheets were belts A, B, C, D, E, F, and G was observed with a laser microscope to calculate the residual rate of the spherical particles.

A table 1 constructed of part 1 and part 2 below illustrates results of the evaluation.

The table 1 illustrates abbreviations that represent chemical substances below.

ACM: acrylic rubber Nipol AR 12 available from Zeon Corporation

NBR: acrylonitrile-butadiene rubber Nipol DN302 available from Zeon Corporation

CIL-312: butyl-3-methylpyridinium bis(trifluoromethanesulfonyl)imide CIL-312 as the ion conductant available from Japan Carlit Co., Ltd.

CIL-R10: butylbishydroxyethylmethylammonium•bis(trifluoromethanesulfonyl)imide CIL-R10 as the ion conductant available from Japan Carlit Co., Ltd.

QAP-01: tetrabutylammonium perchlorate QAP-01 available from Japan Carlit Co., Ltd.

TABLE 1

| Part 1 | | | |
| --- | --- | --- | --- |
| | Intermediate transfer belt | | |
| | Type | Material of elastic layer | Flame retardant |
| Embodiment 1 | Intermediate transfer belt A | ACM | Magnesium hydroxide |
| Embodiment 2 | Intermediate transfer belt B | ACM | Aluminum hydroxide |
| Embodiment 3 | Intermediate transfer belt C | ACM | Magnesium hydroxide |
| Embodiment 4 | Intermediate transfer belt D | ACM | Magnesium hydroxide |
| Embodiment 5 | Intermediate transfer belt E | ACM | Aluminum hydroxide |
| Comparative example 1 | Intermediate transfer belt F | ACM | Magnesium hydroxide |
| Comparative example 2 | Intermediate transfer belt G | NBR | Magnesium hydroxide |

| Part 2 | | | |
| --- | --- | --- | --- |
| | Intermediate transfer belt | Evaluation | |
| | Ion conductant | Material of spherical particles | Residual rate of spherical particles / White spot streak |
| Embodiment 1 | CIL-312 | Melamine resin | 75% / Fair |
| Embodiment 2 | CIL-312 | Melamine resin | 82% / Fair |
| Embodiment 3 | CIL-312 | Acrylic resin | 86% / Fair |
| Embodiment 4 | CIL-R10 | Melamine resin | 89% / Good |
| Embodiment 5 | CIL-R10 | Acrylic resin | 94% / Good |
| Comparative example 1 | QAP-01 | Melamine resin | 53% / Poor |
| Comparative example 2 | CIL-312 | Melamine resin | 30% / Poor |

OK TopKote Matt N available from Oji Paper Co., Ltd. Thereafter, coated sheets having an A3 size were conveyed through the image forming apparatus 100A to identify toner images having a white spot streak that had a width of the A4 size. The toner images were evaluated according to evaluation criteria below.

[Evaluation Criteria]

Good: No white spot streak appeared.

Fair: An allowable, slight white spot streak appeared.

Poor: An unallowable, white spot streak appeared.

A description is provided of an evaluation of a residual rate of the spherical particles. Before and after the coated sheets were conveyed through the image forming apparatus 100A for evaluation of the white spot streak, separation of the spherical particles from each of the intermediate transfer The embodiments of the present disclosure described above provide an intermediate transfer belt (e.g., the intermediate transfer belts 4, 501, and 22) and an image forming apparatus (e.g., the image forming apparatuses 100 and 100A). The intermediate transfer belt improves durability and flame retardancy to prevent edges of a sheet (e.g., the transfer sheet P) from separating spherical particles (e.g., the spherical particles 3) from the intermediate transfer belt. The image forming apparatus preferably forms a full color image by an intermediate transfer method using the intermediate transfer belt.

A description is provided of a configuration of a first comparative intermediate transfer belt.

The first comparative intermediate transfer belt has a surface coated with beads having a diameter not greater than 3 μm.

A description is provided of a configuration of a second comparative intermediate transfer belt.

The second comparative intermediate transfer belt has a surface made of a material having an affinity with fine particles treated with a hydrophobic treatment. Thus, the second comparative intermediate transfer belt includes a surface layer made of the fine particles treated with the hydrophobic treatment.

A description is provided of a configuration of a third comparative intermediate transfer belt.

The third comparative intermediate transfer belt is a tubular belt constructed of three layers, that is, a base layer, a binder layer, and a fine particle layer.

A description is provided of a configuration of a fourth comparative intermediate transfer belt and a fifth comparative intermediate transfer belt.

Each of the fourth comparative intermediate transfer belt and the fifth comparative intermediate transfer belt is a conductive, endless belt that includes a surface layer made of thermoplastic resin as a main ingredient. An entire surface of the surface layer is embedded with powder having a diameter smaller than a diameter of a toner particle in a state in which at least a part of the powder is exposed.

A description is provided of a configuration of a sixth comparative intermediate transfer belt.

The sixth comparative intermediate transfer belt includes a rubber layer and a surface layer disposed on the rubber layer. The rubber layer is added with bis(trifluoromethanesulfonyl)imide (TFSI). The surface layer is added with particles for roughening.

In contrast to the configurations of the first to sixth comparative intermediate transfer belts described above, the embodiments of the present disclosure provide aspects below, for example.

A description is provided of a first aspect of the embodiments of the present disclosure.

As illustrated in FIGS. 4A, 6, and 7, a latent image is formed on an image bearer (e.g., the photoconductive drums 200, 21Bk, 21M, 21Y, and 21C). The latent image is developed with toner into a toner image. The toner image is transferred onto a transfer belt (e.g., the intermediate transfer belts 4, 501, and 22).

The transfer belt has a layer structure constructed of at least a base layer (e.g., the base layer 1) and an elastic layer (e.g., the elastic layer 2) disposed on the base layer. The base layer defines an inner layer. The elastic layer has an outer face (e.g., the outer face 2a) that has surface asperities defined by spherical particles (e.g., the spherical particles 3).

The elastic layer includes acrylic rubber and an ion conductant.

The ion conductant includes an anionic component made of bis(trifluoromethanesulfonyl)imide (TFSI).

A description is provided of a second aspect of the embodiments of the present disclosure.

According to the first aspect, the ion conductant further includes a cationic component made of butylbishydroxyethylmethylammonium or butyl-3-methylpyridinium.

A description is provided of a third aspect of the embodiments of the present disclosure.

According to the first aspect or the second aspect, the elastic layer of the transfer belt includes aluminum hydroxide.

A description is provided of a fourth aspect of the embodiments of the present disclosure.

According to any one of the first aspect to the third aspect, the spherical particles of the transfer belt include acrylic resin.

A description is provided of a fifth aspect of the embodiments of the present disclosure.

According to any one of the first aspect to the fourth aspect, the transfer belt includes a seamless belt.

A description is provided of a sixth aspect of the embodiments of the present disclosure.

As illustrated in FIGS. 4A, 6, and 7, an image forming apparatus (e.g., the image forming apparatuses 100 and 100A) includes an image bearer (e.g., the photoconductive drums 200, 21Bk, 21M, 21Y, and 21C), a developing device (e.g., the black developing device 231K, the cyan developing device 231C, the magenta developing device 231M, the yellow developing device 231Y, and the developing devices 20Bk, 20M, 20Y, and 20C), a transfer belt (e.g., the intermediate transfer belts 4, 501, and 22), a primary transferor (e.g., the primary transfer bias rollers 507, 23Bk, 23M, 23Y, and 23C), and a secondary transferor (e.g., the secondary transfer bias rollers 605 and 60).

The image bearer bears a latent image and a toner image. The developing device develops the latent image formed on the image bearer into the toner image with toner. The primary transferor primarily transfers the toner image formed on the image bearer onto the transfer belt. Thus, the transfer belt is primarily transferred with the toner image developed by the developing device. The secondary transferor secondarily transfers the toner image formed on the transfer belt onto a recording medium (e.g., the transfer sheet P). The transfer belt is configured according to any one of the first aspect to the fifth aspect.

A description is provided of a seventh aspect of the embodiments of the present disclosure.

As illustrated in FIG. 7, according to the sixth aspect, the image forming apparatus includes a full color image forming apparatus that forms a full color toner image on the recording medium. The image forming apparatus further includes another image bearer (e.g., the photoconductive drums 21Bk, 21M, 21Y, and 21C) that bears another latent image and is arranged with the image bearer in line and another developing device (e.g., the developing devices 20Bk, 20M, 20Y, and 20C) that is disposed opposite the another image bearer. The another developing device develops the another latent image into another toner image in a color that is different from a color of the toner image formed on the image bearer.

According to the first aspect to the seventh aspect, the transfer belt improves transfer of the toner image onto the recording medium having surface asperities. Even if the transfer belt is used for an extended period of time, the spherical particles are not separated from a surface of the transfer belt by edges of the recording medium. The transfer belt is immune from precipitation of the ion conductant and improves durability.

The image forming apparatus (e.g., the image forming apparatuses 100 and 100A) according to the embodiments described above is a copier or a printer. Alternatively, the image forming apparatus may be a facsimile machine, a multifunction peripheral (MFP) having at least two of copying, printing, scanning, facsimile, and plotter functions, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A transfer belt comprising:

a base layer; and an elastic layer disposed on the base layer, the elastic layer having an outer face that has surface asperities defined by spherical particles, the elastic layer including acrylic rubber and an ion conductant, the ion conductant including an anionic component made of bis(trifluoromethanesulfonyl)imide (TFSI), wherein the ion conductant further includes a cationic component including butylbishydroxyethylmethylammonium.

2. The transfer belt according to claim 1, wherein:

the base layer defines an inner layer.

3. The transfer belt according to claim 1, wherein;

the elastic layer further includes aluminum hydroxide.

4. The transfer belt according to claim 1, wherein;

the spherical particles include acrylic resin.

5. The transfer belt according to claim 1, wherein;

a part of each of the spherical particles is embedded in the elastic layer.

6. The transfer belt according to claim 1, wherein:

the spherical particles include acrylic resin particles.

7. The transfer belt according to claim 1, wherein:

the elastic layer has a micro rubber hardness of from 30 to 80, at a temperature of 25 degrees Celsius under a relative humidity (RH) of 50 percent.

8. The transfer belt according to claim 1, wherein:

the elastic layer has a thickness not smaller than 200 μm and not greater than 600 μm.

9. The transfer belt according to claim 1, wherein:

the base layer has a thickness not smaller than 50 μm and not greater than 80 μm.

10. An image forming apparatus comprising:

an image bearer to bear a latent image;

a developing device to develop the latent image into a toner image; and a transfer belt disposed opposite the image bearer, the transfer belt including:

a base layer; and an elastic layer disposed on the base layer, the elastic layer having an outer face that has surface asperities defined by spherical particles, the elastic layer including acrylic rubber and an ion conductant, the ion conductant including an anionic component made of bis(trifluoromethanesulfonyl)imide (TFSI), wherein the ion conductant further includes a cationic component including butylbishydroxyethylmethylammonium.

11. The image forming apparatus according to claim 10, further comprising:

a primary transferer to transfer the toner image formed on the image bearer onto the transfer belt; and a secondary transferer to transfer the toner image formed on the transfer belt onto a recording medium.

12. The image forming apparatus according to claim 10, wherein the transfer belt includes a seamless belt.

13. The image forming apparatus according to claim 10, further comprising:

another image bearer to bear another latent image, said another image bearer arranged with the image bearer in line; and another developing device disposed opposite said another image bearer, said another developing device to develop said another latent image into another toner image in a color that is different from a color of the toner image formed on the image bearer.

14. The image forming apparatus according to claim 10, wherein:

the spherical particles include acrylic resin particles.

15. The image forming apparatus according to claim 10, wherein:

the elastic layer has a micro rubber hardness of from 30 to 80, at a temperature of 25 degrees Celsius under a relative humidity (RH) of 50 percent.

16. The image forming apparatus according to claim 10, wherein;

the elastic layer has a thickness not smaller than 200 μm and not greater than 600 μm.

17. The image forming apparatus according to claim 10, wherein:

the base layer includes polyimide.

18. The image forming apparatus according to claim 10, wherein:

the image bearer includes a photoconductive drum.

19. The image forming apparatus according to claim 10, wherein:

the developing device contains one of yellow, magenta, cyan, and black toners.

20. The image forming apparatus according to claim 10, further comprising:

a fixing device to fix the toner image on a recording medium.

* * * * *